United States Patent
Sarkar et al.

(10) Patent No.: US 11,849,028 B2
(45) Date of Patent: Dec. 19, 2023

(54) METHOD AND SYSTEM FOR SECURE IOT DEVICE ONBOARDING USING A BLOCKCHAIN NETWORK

(71) Applicant: Tata Consultancy Services Limited, Mumbai (IN)

(72) Inventors: Sumanta Sarkar, Hyderabad (IN); Habeeb Basha Syed, Hyderabad (IN); Vinayak Kumar Charaka, Hyderabad (IN)

( * ) Notice: Subject to any disclaimer, the term of this patent is extended or adjusted under 35 U.S.C. 154(b) by 272 days.

(21) Appl. No.: 17/528,730

(22) Filed: Nov. 17, 2021

(65) Prior Publication Data
US 2022/0224518 A1    Jul. 14, 2022

(30) Foreign Application Priority Data
Jan. 13, 2021  (IN) .............................. 202121001673

(51) Int. Cl.
*H04L 9/08* (2006.01)
*H04L 9/32* (2006.01)

(52) U.S. Cl.
CPC .......... *H04L 9/0825* (2013.01); *H04L 9/0866* (2013.01); *H04L 9/0869* (2013.01); *H04L 9/3273* (2013.01)

(58) Field of Classification Search
CPC ..... G06F 21/44; G06F 21/64; H04L 63/0823; H04L 63/0869; H04L 63/0876; H04L 67/12; H04L 9/0825; H04L 9/0866; H04L 9/0869; H04L 9/3239; H04L 9/3247; H04L 9/3268; H04L 9/3271; H04L 9/3273;

(Continued)

(56) References Cited

U.S. PATENT DOCUMENTS 10,270,770 B1 *  4/2019  Irwan ................... H04L 63/0876
10,346,614 B1 *  7/2019  Ko .......................... H04L 63/08
10,657,261 B2 *  5/2020  Kumar .................. H04L 9/3263
(Continued)

FOREIGN PATENT DOCUMENTS

WO     WO 2019/089164 A1    5/2019

OTHER PUBLICATIONS

Compagno et al., "OnboardICNg: a Secure Protocol for Onboarding IoT Devices in ICN," (2016).
(Continued)

*Primary Examiner* — Sharon S Lynch
(74) *Attorney, Agent, or Firm* — Finnegan, Henderson, Farabow, Garrett & Dunner LLP

(57) ABSTRACT

This disclosure relates generally to method and system for secure IoT device onboarding using a blockchain network. Internet of Things (IoT) device onboarding is a challenging problem as it needs to be securely connected to its actual final owner, with minimal manual intervention. Onboarding provides provisioning the IoT devices with credentials for accessing a network resource and assigning appropriate permissions. The present disclosure establishes a mutual authentication between at least one IoT device from the one or more IoT devices and a TIMS. Further, based on the verified authentication the TIMS enables the device to identify its current owner using a blockchain network. Further, the IoT device authenticating parameter is computed for authentication of the TIMS with at least one IoT device from the one or more IoT devices.

9 Claims, 7 Drawing Sheets

(58) Field of Classification Search
CPC .... H04L 9/50; H04W 12/009; H04W 12/069; H04W 12/71
See application file for complete search history.

(56) References Cited

U.S. PATENT DOCUMENTS

| | | | |
|---|---|---|---|
| 10,673,617 B1* | 6/2020 | Antoniou | G06F 13/4282 |
| 10,708,069 B2* | 7/2020 | Chun | H04L 9/3273 |
| 10,715,339 B1* | 7/2020 | Wei | H04L 9/0894 |
| 10,764,032 B2* | 9/2020 | Wang | H04L 9/0637 |
| 10,805,069 B1* | 10/2020 | Irwan | H04L 63/0442 |
| 10,831,894 B2* | 11/2020 | Kornegay | H04W 12/128 |
| 11,337,070 B2* | 5/2022 | Heldt-Sheller | H04W 12/084 |
| 11,399,285 B2* | 7/2022 | Smith | H04W 12/35 |
| 11,403,402 B2* | 8/2022 | Kumar | H04L 63/0823 |
| 11,481,509 B1* | 10/2022 | Prasad | G06F 16/24564 |
| 2018/0254905 A1* | 9/2018 | Chun | H04L 9/3273 |
| 2019/0163912 A1* | 5/2019 | Kumar | H04L 9/0891 |
| 2020/0242249 A1* | 7/2020 | Kumar | H04L 9/3297 |
| 2020/0275273 A1* | 8/2020 | Smith | H04W 12/50 |
| 2020/0314648 A1* | 10/2020 | Cao | H04L 9/0643 |
| 2021/0176638 A1* | 6/2021 | Heldt-Sheller | H04W 12/06 |
| 2022/0398322 A1* | 12/2022 | Kumar | G06F 21/575 |
| 2023/0110131 A1* | 4/2023 | Smith | H04L 69/22 |
| | | | 370/254 |

OTHER PUBLICATIONS

Qu et al., "Blockchain Based Credibility Verification Method for IoT Entities," Security and Communication Networks (2018).

* cited by examiner

300 establishing a mutual authentication between at least one IoT device from the one or more IoT devices and a trusted identity management server (TIMS) comprises:

(i) authenticating, at least one IoT device from the one or more IoT devices with the trusted identity management server (TIMS) by performing the steps of: receiving by at least one IoT device, a first set of random numbers generated by the trusted identity management server (TIMS) corresponding to the IoT device from the one or more IoT devices; computing by at least one IoT device, a digital signature corresponding to each IoT device from the one or more IoT devices based on (i) the first set of random numbers generated by the trusted identity management server (TIMS), and (ii) a secret key corresponding to the IoT device from the one or more IoT devices; and verifying by the trusted identity management server (TIMS), authentication of at least one IoT device from the one or more IoT devices based on (i) the digital signature computed corresponding to the IoT device, and (ii) a public key corresponding to the IoT device;

(ii) authenticating, the trusted identity management server (TIMS) with at least one IoT device from the one or more IoT devices by; computing, an IoT device authenticating parameter for at least one IoT device based on (i) a third set of random numbers prestored into read only memory of the corresponding to the IoT device, and (ii) a second set of random numbers generated by the trusted identity management server (TIMS) corresponding to the IoT device;

302

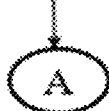

FIG.3A

identifying by at least one IoT device, a current owner of at least one IoT device onboarding in the blockchain network by performing the steps of:

(a) obtaining by at least one IoT device, a response generated from the trusted identity management server (TIMS) for a request initiated by at least one IoT device based on (i) a list of randomly selected peer nodes configured to a plurality of blockchain identifiers comprising information corresponding to a plurality of blockchain peer nodes, and (ii) a node parameter;

(b) receiving by at least one IoT device from the one or more IoT devices, the current IoT device owner information by querying randomly selected peer node configured to the blockchain; and (c) selecting the current IoT device owner for onboarding from the one or more IoT devices using the blockchain network based on the maximum occurrence of the current IoT device owner from the list of a plurality of registered IoT device owners.

304

FIG.3B

METHOD AND SYSTEM FOR SECURE IOT DEVICE ONBOARDING USING A BLOCKCHAIN NETWORK

CROSS-REFERENCE TO RELATED APPLICATIONS AND PRIORITY

This U.S. Patent application claims priority under 35 U.S.C. § 119 to: Indian patent Application no. 202121001673, filed on Jan. 13, 2021. The entire contents of the aforementioned application are incorporated herein by reference.

TECHNICAL FIELD

The disclosure herein generally relates to the field of IoT device onboarding, and, more particularly, to method and system for secure IoT device onboarding using a blockchain network.

BACKGROUND

Internet of Things (IoT) devices are physical objects that may communicate on a network, and may include sensors, actuators, and other input/output components, such as to collect data or perform actions from a real world environment. For example, the IoT devices may include low-powered devices that are embedded or attached to everyday things, such as buildings, vehicles, packages, and thereof to provide an additional level of artificial sensory perception of those things. Recently, IoT devices have become more popular and thus various applications using these devices have been proliferated. IoT is based on the idea that everyday objects, not just computers and computer networks, can be readable, recognizable, locatable, addressable, and controllable via an IoT communications network (e.g., an ad-hoc system or the Internet). Once an IoT device leaves its manufacturer, the device starts its journey and goes from one hand to another before it reaches the final deployment site. Typically, at the deployment site, these IoT devices must connect to an IoT network for identifying the final owner (cloud service) which will be managing it throughout its life cycle.

IoT device onboarding is a challenging problem as it needs to be securely connected to its actual final owner, and at the same time with minimal manual intervention. Further, IoT devices typically go through 'commissioning' or 'onboarding' process to establish trust in the device and to provision operational credentials. To accomplish this, the new IoT device must be connected to the commissioning service. This problem is challenging to ensure secure ownership transfer with the final owner.

Currently available solutions show that blockchain is useful in maintaining a secure ledger of ownership records. However, solutions that incorporate blockchains involve high computing devices, and not suitable for resource constrained devices. For example, the IoT device is not capable of running a node in a blockchain. Even in order to leverage the advantage of blockchain, the IoT device queries multiple nodes which lacks required resources to check the veracity of different responses as this requires to store all possible certificates pertaining to different certificate authorities.

SUMMARY

Embodiments of the present disclosure present technological improvements as solutions to one or more of the above-mentioned technical problems recognized by the inventors in conventional systems. For example, in one embodiment, a system for secure IoT device onboarding using a blockchain network. The system includes establishing a mutual authentication between at least one IoT device from the one or more IoT devices and a Trusted Identity Management Server (TIMS) comprises authenticating, at least one IoT device from the one or more IoT devices with the TIMS by performing the steps of: (a) receiving by at least one IoT device, a first set of random numbers generated by the TIMS corresponding to the IoT device from the one or more IoT devices, (b) computing by at least one IoT device, a digital signature corresponding to each IoT device from the one or more IoT devices based on (i) the first set of random numbers generated by the TIMS, and (ii) a secret key corresponding to the IoT device from the one or more IoT devices; and (c) verifying by the TIMS, authentication of at least one IoT device from the one or more IoT devices based on (i) the digital signature computed corresponding to the IoT device, and (ii) a public key corresponding to the IoT device.

In one embodiment, the TIMS with at least one IoT device from the one or more IoT devices by, (a) computing, an IoT device authenticating parameter for at least one IoT device based on (i) a third set of random numbers prestored into read only memory of the corresponding to the IoT device, and (ii) a second set of random numbers generated by the TIMS corresponding to the IoT device. Further, at least one IoT device identifies a current owner of at least one IoT device onboarding in the blockchain network by performing the steps of: (a) obtaining by at least one IoT device, a response generated from the TIMS for a request initiated by at least one IoT device based on (i) a list of randomly selected peer nodes configured to a plurality of blockchain identifiers comprising information corresponding to a plurality of blockchain peer nodes, and (ii) a node parameter. Further, receiving by at least one IoT device owner from the one or more IoT devices, the current IoT device owner information by querying randomly selected peer node configured to the blockchain; and selecting the current IoT device owner for onboarding from the one or more IoT devices using the blockchain network based on the maximum occurrence of the current IoT device owner from the list of a plurality of registered IoT device owners.

In another aspect, a method for secure IoT device onboarding using a blockchain network is provided. The method includes a processor, an Input/output (I/O) interface and a memory coupled to the processor is capable of executing programmed instructions stored in the processor in the memory for establishing a mutual authentication between at least one IoT device from the one or more IoT devices and a TIMS comprises authenticating, at least one IoT device from the one or more IoT devices with the TIMS by performing the steps of: (a) receiving by at least one IoT device, a first set of random numbers generated by the TIMS corresponding to the IoT device from the one or more IoT devices, (b) computing by at least one IoT device, a digital signature corresponding to each IoT device from the one or more IoT devices based on (i) the first set of random numbers generated by the TIMS, and (ii) a secret key corresponding to the IoT device from the one or more IoT devices; and (c) verifying by the TIMS, authentication of at least one IoT device from the one or more IoT devices based on (i) the digital signature computed corresponding to the IoT device, and (ii) a public key corresponding to the IoT device.

In another embodiment, the TIMS with at least one IoT device from the one or more IoT devices by, (a) computing, an IoT device authenticating parameter for at least one IoT device based on (i) a third set of random numbers prestored into read only memory of the corresponding IoT device, and (ii) a second set of random numbers generated by the TIMS corresponding to the IoT device. Further, at least one IoT device identifies a current owner of at least one IoT device onboarding in the blockchain network by performing the steps of: (a) obtaining by at least one IoT device, a response generated from the TIMS for a request initiated by at least one IoT device based on (i) a list of randomly selected peer nodes configured to a plurality of blockchain identifiers comprising information corresponding to a plurality of blockchain peer nodes, and (ii) a node parameter. Further, receiving by at least one IoT device owner from the one or more IoT devices, the current IoT device information by querying randomly selected peer node configured to the blockchain; and selecting the current IoT device owner for onboarding from the one or more IoT devices using the blockchain network based on the maximum occurrence of the current IoT device owner from the list of a plurality of registered IoT device owners.

In yet another aspect, a non-transitory computer readable medium provides one or more non-transitory machine-readable information storage mediums comprising one or more instructions, which when executed by one or more hardware processors perform actions includes an I/O interface and a memory coupled to the processor is capable of executing programmed instructions stored in the processor in the memory to establishing a mutual authentication between at least one IoT device from the one or more IoT devices and a TIMS comprises authenticating, at least one IoT device from the one or more IoT devices with the TIMS by performing the steps of: (a) receiving by at least one IoT device, a first set of random numbers generated by the TIMS corresponding to the IoT device from the one or more IoT devices, (b) computing by at least one IoT device, a digital signature corresponding to each IoT device from the one or more IoT devices based on (i) the first set of random numbers generated by the TIMS, and (ii) a secret key corresponding to the IoT device from the one or more IoT devices; and (c) verifying by the TIMS, authentication of at least one IoT device from the one or more IoT devices based on (i) the digital signature computed corresponding to the IoT device, and (ii) a public key corresponding to the IoT device.

In another embodiment the TIMS with at least one IoT device from the one or more IoT devices by, (a) computing, an IoT device authenticating parameter for at least one IoT device based on (i) a third set of random numbers prestored into read only memory of the corresponding IoT device, and (ii) a second set of random numbers generated by the TIMS corresponding to the IoT device. Further, at least one IoT device identifies a current owner of at least one IoT device onboarding in the blockchain network by performing the steps of: (a) obtaining by at least one IoT device, a response generated from the TIMS for a request initiated by at least one IoT device based on (i) a list of randomly selected peer nodes configured to a plurality of blockchain identifiers comprising information corresponding to a plurality of blockchain peer nodes, and (ii) a node parameter. Further, receiving by at least one IoT device from the one or more IoT devices, the current IoT device owner information by querying randomly selected peer node configured to the blockchain; and selecting the current IoT device owner for onboarding from the one or more IoT devices using the blockchain network based on the maximum occurrence of the current IoT device owner from the list of a plurality of registered IoT device owners.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 3A and FIG. 3B illustrates a flow diagram of a method for identifying current IoT device owner for onboarding, using the system of FIG. 1, in accordance with some embodiments of the present disclosure.

DETAILED DESCRIPTION OF EMBODIMENTS

Figure 1:
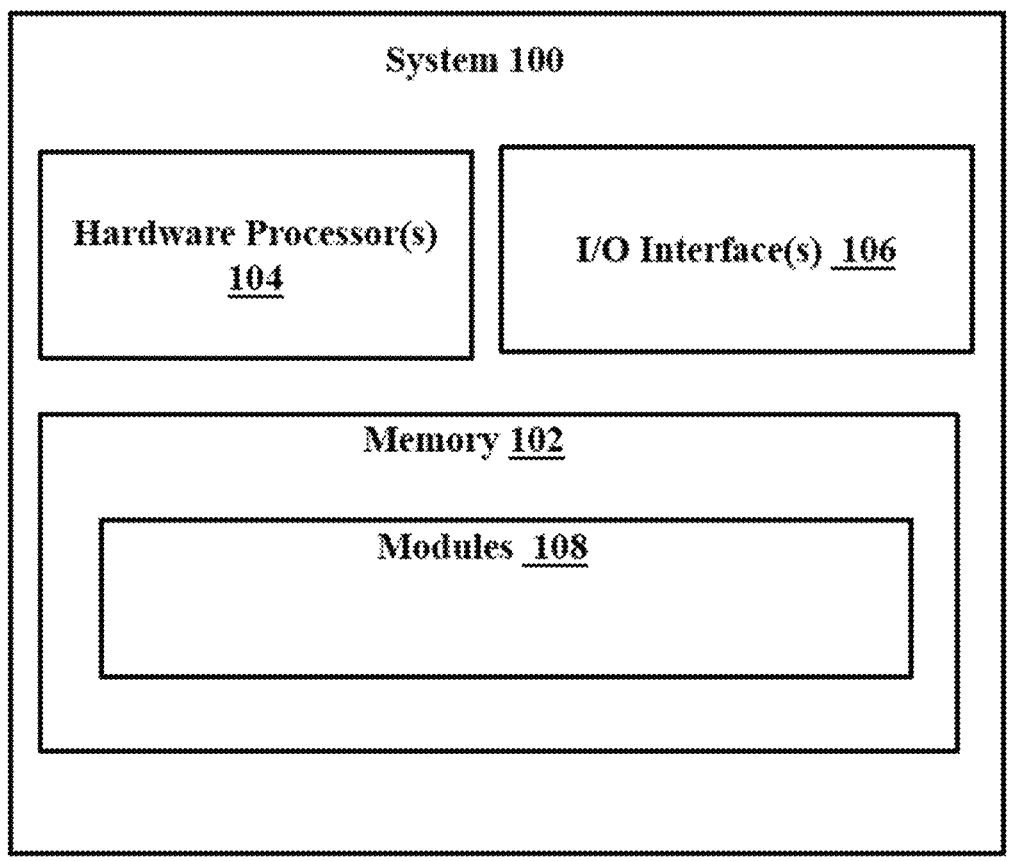
FIG. 1 illustrates a functional block diagram of a system for secured IoT device onboarding using a blockchain network, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Onboarding is a process of registration of new Internet of Things (IoT) device to be a part of an IoT network by sharing configuration details. Onboarding provides provisioning the IoT devices with credentials for accessing a network resource and assigning appropriate permissions. Further, each IoT network consists of large number of IoT devices which connects and work with each other. In enterprises for setting up a new business application organization run large IoT networks which are required to add new IoT devices frequently. In general, the process of adding new IoT devices in the IoT network and updating these IoT devices with new credentials of owner is referred as "Device Onboarding".

The embodiments herein provides a method and system for secure IoT device onboarding using a blockchain network. The method and system disclosed herein, enables secure and automatic onboarding of IoT devices using blockchain. The present disclosure is a three step process comprising 1. Blockchain setup 2. Record transfer of ownership and 3. IoT device onboarding. Generally, the blockchain setup is a one time activity. Blockchain keeps track of ownership that ensures every device identifies its right owner. An identity manager referred to as trusted identity management server and alternatively referred as TIMS, performs for each IoT device to verify and issue identity certificate to a plurality of blockchain peer nodes. Further, the method eliminates manual intervention in the process of IoT device onboarding by verifying blockchain peer node responses with minimal prestored information. The present disclosure reduces cost, time and resources required for IoT device management. Additionally, thereby improving performance such as increased throughput, secured and scalable IoT device onboarding which can be implemented for secured automated connectivity.

Glossary:

IoT Device: Devices that are used in the IoT network such as smart bulbs, sensors, routers etc. These devices are denoted using the notation 'D'. Following the data is embedded in each device 'D' at the time of its fabrication:

(a) Identity information of 'D' such as its serial number, name of its manufacturer, and thereof.
(b) A certificate of identity issued by the manufacturer.
(c) Root Certificate of the TIMS.
(d) Contact information comprising an IP address or URL of the TIMS.
(e) A random number embedded into the device 'D'.

Trusted Identity Management Server (TIMS): This is an identity management server(s) to be used by all entities joining the IoT blockchain network. The objective of the TIMS are as follows, (a) Authenticating IoT devices.
(b) Issue identity certificates to the plurality of blockchain peer nodes.
(c) Respond to queries received from the one or more IoT devices.

Joining the plurality of blockchain peer nodes are required to obtain the certificate of identity issued by the TIMS. This certificate is similar to a transport layer certificate (TLS) and binds identity of the device or entity with a pair of public-private keys.

IoT network management services (such as AWS IoT, IBM IoT Platform): The plurality of blockchain peer nodes associated with the IoT network maintains records of ownership of devices in the form of transactions. The transactions are proposed by peers and approved using consensus mechanism. Once approved the transactions gets added to the blockchain network that creates immutable record. The IoT blockchain network supports all type of transactions.

Transfer of Ownership: This is a transaction that records change of ownership of at least one device 'D' from its current owner 'currOWND' to a new owner 'newOWND'. This transaction is initiated by the 'currOWND' indicating transfer of ownership of the device 'D' to the 'newOWND'. Once the transaction is committed to the plurality of blockchain peer nodes associated with the IoT network, then the 'newOWND' becomes the 'currOWND'. Further, the utilization of the command TCTX('D; currOWND; newOWND') to denote the transaction of this type where all the entities are identified by their certificates issued by the TIMS.

Notations:
'D'—IoT device
'MFR'—manufacturer
'TIMS'—Trusted identity management server
'DIST'—distributer
'RET'—retailer
'currOWN'—current Owner
'newOWN'—new Owner
'$IOT_{BC}$'—blockchain with all potential owners of IoT devices as members
'$p_1, p_2, \ldots p_m$'—peers to IoT blockchain Referring now to the drawings, and more particularly to FIG. 1 through FIG. 5, where similar reference characters denote corresponding features consistently throughout the figures, there are shown preferred embodiments and these embodiments are described in the context of the following exemplary system and/or method. The system is adapted to provide secured IoT device onboarding using the blockchain network.

FIG. 1 illustrates a block diagram of a system (100) for securing IoT device onboarding using the blockchain network in accordance with an example embodiment. In an embodiment, the system 100 includes processor (s) 104, communication interface device(s), alternatively referred as or I/O interface(s) 106, and one or more data storage devices or memory 102 operatively coupled to the processor (s) 104. The processor (s) 104 may be alternatively referred as one or more hardware processors or simply processor (104). In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) 104 is configured to fetch and execute computer-readable instructions stored in the memory. In an embodiment, the present subject matter is explained considering that the system 100 is implemented for onboarding of one or more IoT devices in the network, it may be understood that the system 100 may not be restricted to any particular machine or network environment. The system 100 can be implemented in a variety of computing systems, such as laptop computers, notebooks, hand-held devices, workstations, mainframe computers, servers, a network cloud and the like.

The I/O interface(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for receiving the input request. The input request is obtained from any external source configured to any blockchain network.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 102 may further comprise information pertaining to input(s)/output(s) of each step performed by the system 102 and methods of the present disclosure. Functions of the components of system 100 are explained in conjunction with method steps of flow diagrams depicted in FIG. 2 and use case examples. The system 100 can be implemented in any blockchain network for performing any IoT device onboarding in the IoT network.

Figure 2:
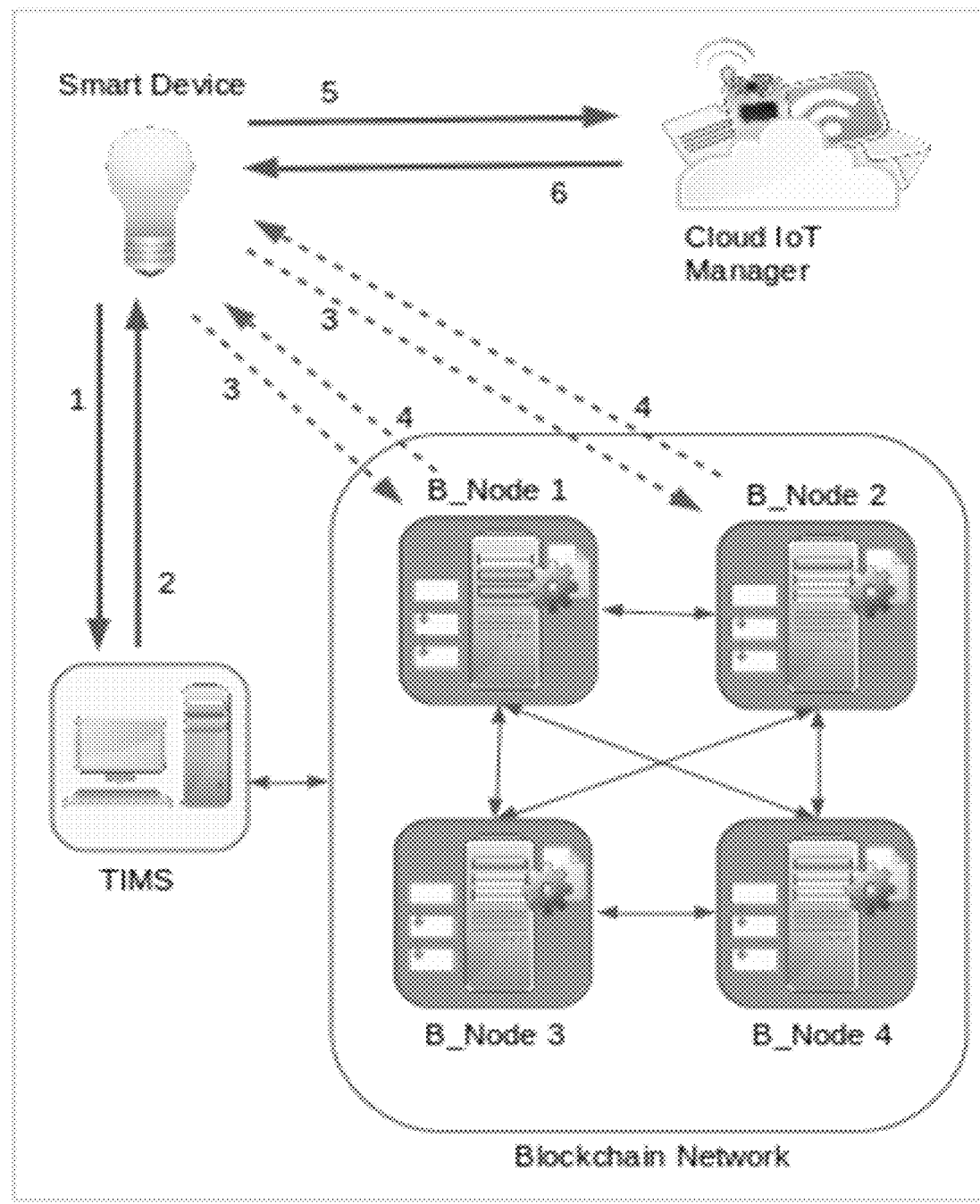
FIG. 2 illustrates a high level architecture for IoT device onboarding, in accordance with some embodiments of the present disclosure.

FIG. 2 illustrates a high-level architecture for IoT device onboarding, in accordance with some embodiments of the present disclosure. The system 100 is configured to at least one IoT device, the TIMS, a cloud IoT manager. The device 'D' used in the IoT network includes one or more smart bulbs, one or more sensors, one or more routers etc. and thereof. Further, each device 'D' provides identity information of each device 'D' such as a serial number, the name of its manufacturer, the certificate of identity issued by the manufacturer. Further, the root certificate of the TIMS and contact information comprising an internet protocol (IP) address or URL of the TIMS and random numbers corresponding to the device 'D' embedded for further process. Depicting an example where the system 100 receives an input request for onboarding of at least one IoT device using the blockchain network. The received input request is further processed by the system 100 for IoT device onboarding by establishing a mutual authentication between each IoT device from the one or more IoT devices 'D' with a TIMS. Further, the proposed disclosure of the system 100 identifies each IoT device's 'currOWND' from the one or more IoT devices 'D' and then enables it to connect securely with 'currOWND'.

FIG. 3A and FIG. 3B illustrates a flow diagram of a method for identifying current IoT device owner for onboarding, using the system of FIG. 1, in accordance with some embodiments of the present disclosure. The steps of the method 300 of the flow diagram will now be explained with reference to the components or blocks of the system 100 in conjunction with the example architecture of the system as depicted in FIG. 1 through FIG. 5. In an embodiment, the system 100 comprises one or more data storage devices or the memory 102 operatively coupled to the processor(s) 104 and is configured to store instructions for execution of steps of the method 200 by the processor(s) 104. Although process steps, method steps, techniques or the like may be described in a sequential order, such processes, methods and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Referring now to the steps of the method 300, at step 302, the one or more hardware processors (104) are configured to establish a mutual authentication between at least one IoT device from one or more IoT devices and a TIMS. The system 100 processes the input request received, for onboarding of at least one IoT device from the one or more IoT devices using the blockchain network. Initially, the system authenticates (referring now to FIG. 4A), each IoT device from the one or more IoT devices with the TIMS. If the onboarding request identified is genuine then the process of authentication is performed, and the process gets aborted for the failed authentication based on a protocol 1 as referred in Table 1. The authentication steps for each IoT device with the TIMS using the protocol 1 is as follows, where each IoT device from the one or more IoT devices sends a certificate to the TIMS. On receiving the certificate from each IoT device the TIMS generates a first set of random numbers 'r' corresponding to the IoT device. The first set of random numbers 'r' generated by the TIMS corresponding to the IoT device is received by each IoT device associated with the blockchain network. Further, a digital signature corresponding to each IoT device from the one or more IoT devices is computed based on (i) the first set of random numbers 'r' generated by the TIMS, and (ii) a secret key '$sk_D$' corresponding to the IoT device from the one or more IoT devices.

TABLE 1

Protocol 1: Authentication of IoT device with the trusted management identity server (TIMS)

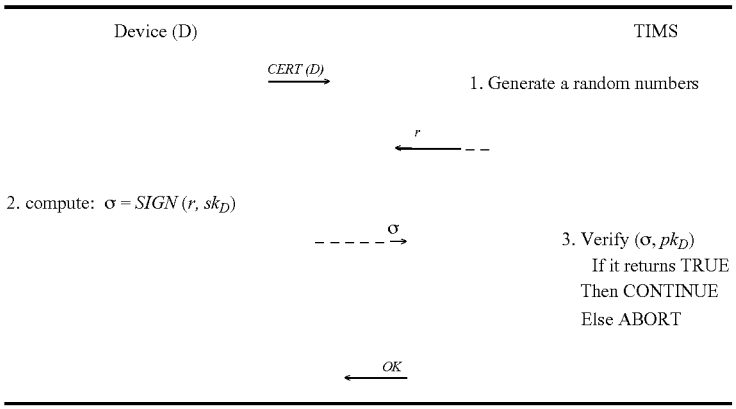

Based on the verified authentication received from the protocol 1, the method further processes for authentication of the TIMS with each IoT device from the one or more IoT devices using a protocol 2. The protocol 2 (Table 2) starts its process when authentication is received from the TIMS recognizing the corresponding IoT device as referred in Table 1. Further, a second set of random numbers 'v' are generated by the TIMS corresponding to the IoT device. Then, each IoT device receives the second set of random numbers 'v' generated by the TIMS corresponding to the IoT device and then obtains an array of random numbers pre-stored into each IoT device from previous authentication 'U'. Here, to prevent attacker from using data from previous authentication exchanged by the IoT device and the TIMS.

TABLE 2

Protocol 2: Authentication of the TIMS with the IoT device

| Device (D) | TIMS |
|---|---|

1. Generate random numbers v

← v —

2. set $U = [u$: random numbers already received during previous authentications$]$ 3. If size of $U == \theta$ : Authentication Limit reached" Abort 4. If $v \in U$, then abort. Else $U \leftarrow U \cup \{v\}$ 5. compute $y = Hash(\alpha || v)$ ---- y →

6. compute $\sigma == SIGN(r, sk_{TIMS})$

← σ ------

7. If VRGY $(\sigma, pk_{TIMS})$ returns TRUE

Then CONTINUE

Else ABORT

The set 'U' keeps track of the second set of random numbers utilized in the previous authentication attempts. Further, whenever a new authentication is executed the IoT device checks availability of the second set of random numbers 'v'. Further, in case of genuine authentication attempts the second set of random numbers 'v' do not repeat. Further, each IoT device determines whether the size of the array of random numbers 'U' is lesser than or equal to a predefined parameter 'θ' to compute the IoT device authenticating parameter 'y' or to abort the execution is the authentication limit is reached. Here, the IoT devices utilizes the second set of random numbers 'v' to prevent attackers from impersonating the TIMS. Considering the IoT device is resource constrained device which is required to limit the size from the set of previous authentication 'U'. The positive integer 'θ' bounds to the maximum possible random numbers that the IoT device can save. The value of the predefined parameter 'θ' depends on the capacity of the IoT device memory.

Figure 4A:
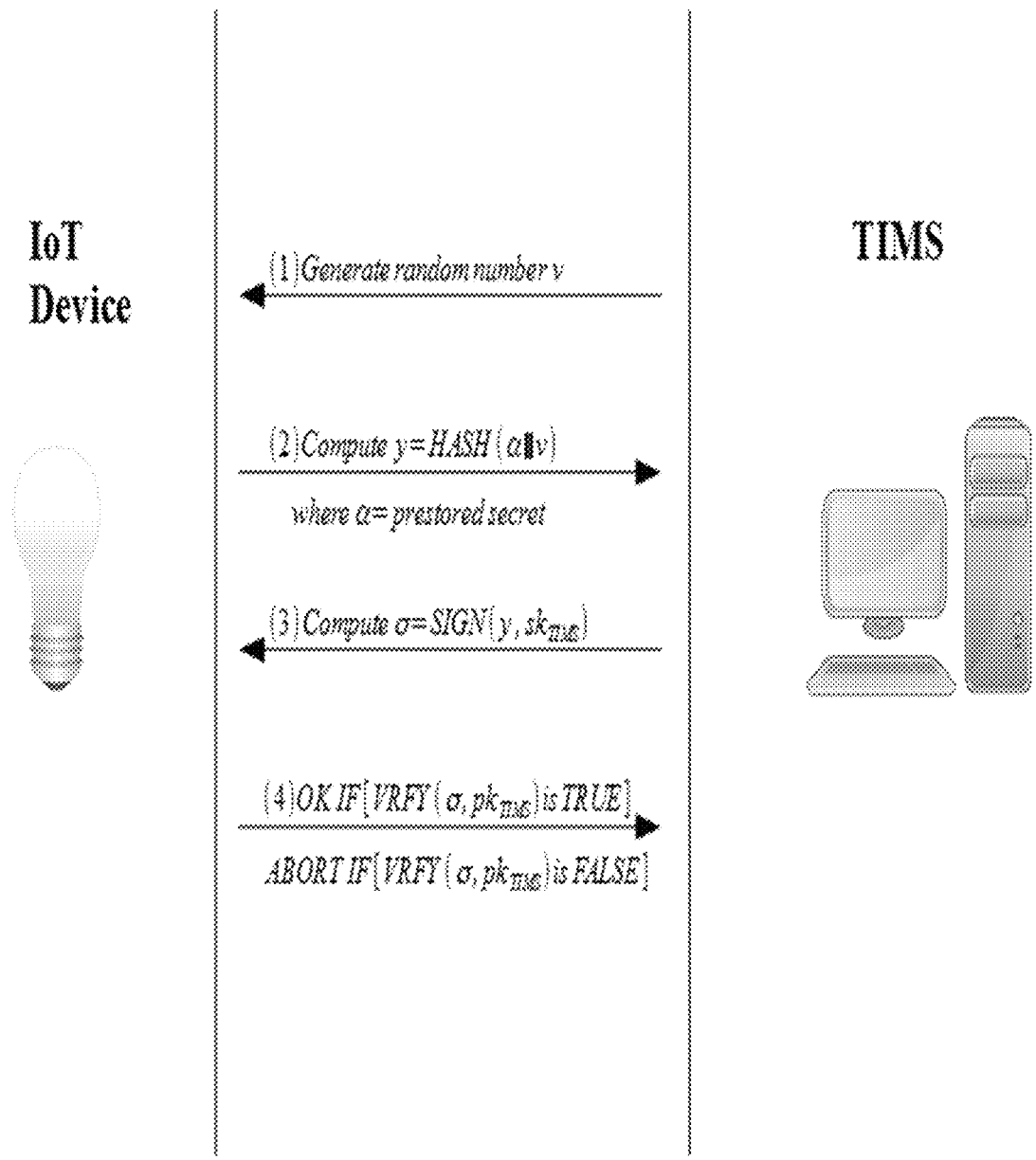
FIG. 4A and FIG. 4B illustrates a method for authenticating TIMS with at least one IoT device for establishing mutual authentication, using the system of FIG. 1, in accordance with some embodiments of the present disclosure.
Figure 4B:
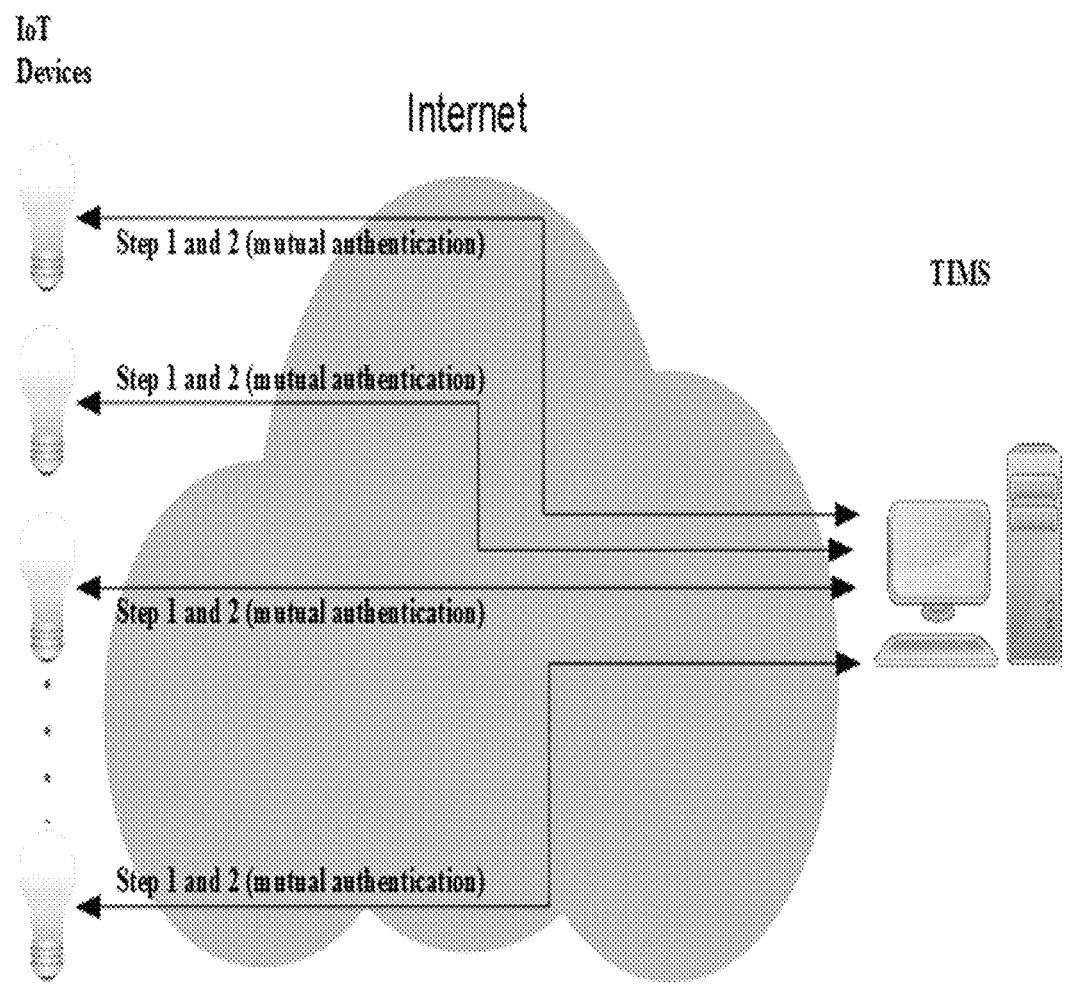
Figure 5:
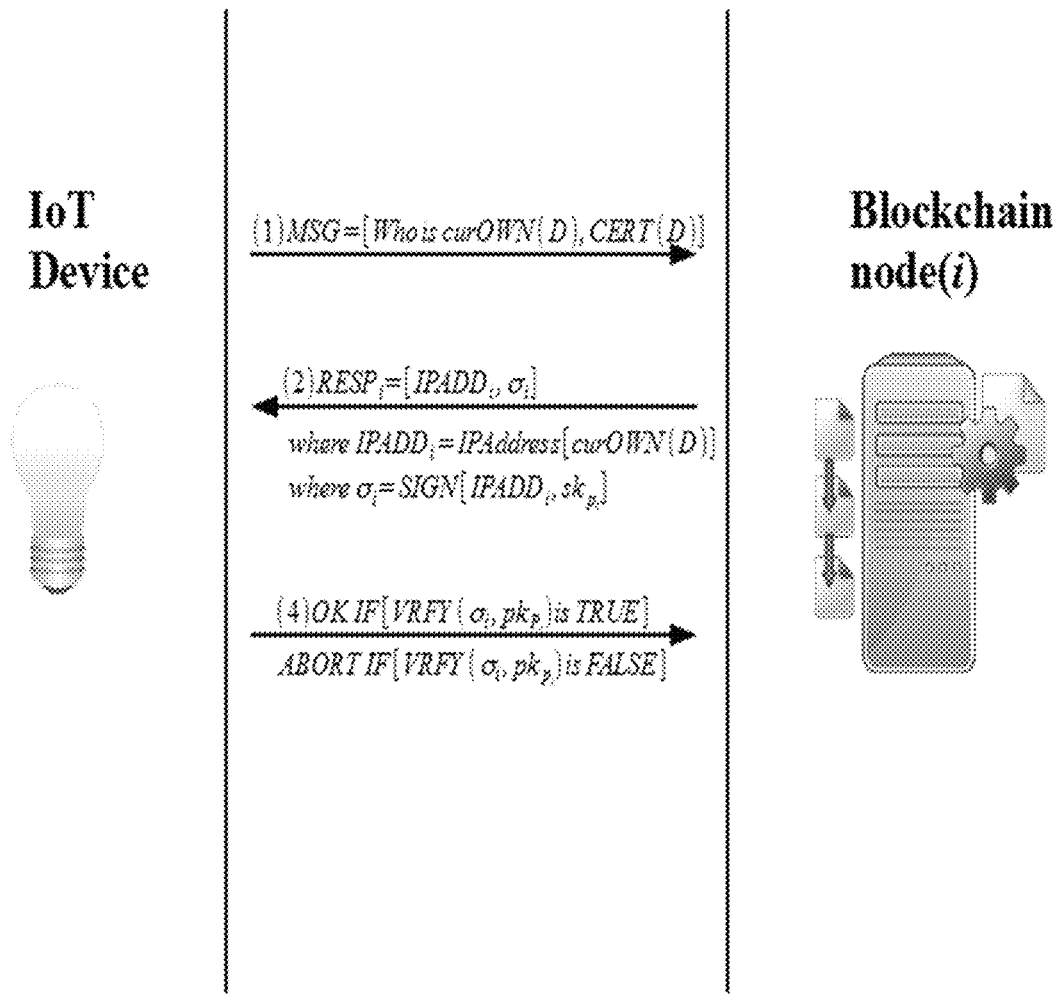
FIG. 5 illustrates a method for identifying a current owner of at least one IoT device for onboarding using the blockchain network, in accordance with some embodiments of the present disclosure.

Further, each IoT device from the one or more IoT devices computes the IoT device authenticating parameter 'y' based on the hashing function of (i) a second set of random numbers 'v' and (ii) the third set of random numbers 'a'. Referring now to FIG. 4A and FIG. 4B, the notation 'U' is the array of random numbers in which the IoT device has prestored the previous authentication attempts. The size of the array is predetermined with the parameter 'θ' which is prefixed by the manufacturer and remained same for the lifetime of the corresponding IoT device 'D'. Also, the array 'U' appends only with no deletions or modifications to existing entries possible. Here, 'v' is the second set of random numbers sent by the TIMS and 'a' is the third set of random numbers prestored in the ROM of the IoT device.

Each IoT device is resource constrained device which may not have sufficient resources in terms of processing of CPU, memory, power and thereof to execute the random number generator. Here, the hashing function is the preselected cryptographic hash function and input to the hash function is concatenation of a and v, which is represented as a||v. Each IoT device further obtains from the TIMS, a TIMS digital signature 'a' and a public key '$pk_{TIMS}$' of the TIMS for authenticating the IoT device. The TIMS digital signature 'σ' is computed by TIMS using (i) the IoT device authenticating parameter 'y', and (ii) a secret key '$sk_{TIMS}$' associated with the TIMS. The verified authentication of each IoT device returns true on successful verification to process further steps using a protocol 3 or aborts the condition for the failed authentication.

Referring now to the steps of the method 300, at step 304, the one or more hardware processors (104) is configured to identify by at least one IoT device, a current owner 'curr-OWND' of at least one IoT device for onboarding by performing the steps of obtaining by least one IoT device, a response generated from the TIMS for a request initiated by the at least one IoT device based on (i) a list of randomly selected peer nodes configured to the plurality of blockchain identifiers comprising information corresponding to a plurality of blockchain peer nodes, and (ii) a node parameter. Considering the above two protocols 1 and 2, authentication of IoT device to TIMS and the authentication of the TIMS with each IoT device is executed using a protocol 3 as referred in Table 3. For each IoT device request the TIMS for each peer node from the plurality of blockchain peer nodes are selected randomly based on a predetermined step.

TABLE 3

Protocol 3: Obtaining the plurality of blockchain peer nodes associated with the IoT network from the TIMS

| Device (D) | TIMS |
|---|---|
| | 1. choose PEERS $(P_1, \ldots P_n)$ randomly from $BC_D$ |
| | 2. Set $INFO(P_i) = \{IP_{ADD}(P_i), CERT(P_i)\}$ |
| | 3. $MSG = [INFO(P_i), \ldots INFO(P_n)]$ |
| | 4. $\sigma == SIGN(MSG, sk_{TIMS})$ |
| | 5. $RESP = [MSG, \sigma]$ |
| $\xleftarrow{\sigma}$ | |
| 6. If $VRFY(\sigma, pk_{TIMS})$ returns TRUE CONTINUE Else ABORT | |
| $\xrightarrow{OK}$ | |

Further, the TIMS from each peer node obtains the IP address and the digital certificate associated with each peer node thereby generating a message. Further, computes the node parameter using the list of randomly selected peer nodes configured to the plurality of blockchain identifiers and the secret key '$sk_{TIMS}$' of the TIMS. The response comprising the message and the digital signature '$\sigma$' is transmitted to the corresponding to the IoT device. The IoT device verifies authentication based on the node parameter and the public key of the TIMS which then authenticates for provisioning to consecutive protocol else aborts the process.

Further, receiving by at least one IoT device from the one or more IoT devices, information of the current IoT device owner information 'currOWND' by querying each blockchain peer node configured to the corresponding IoT device. Here, this protocol executes based on the successful completion of protocol 3. In this Protocol 4 (refer Table 4), the IoT device 'D' contacts each peer node $p_i$ from the plurality of blockchain peer nodes selected by TIMS and requests it to search for its actual IoT device 'D' owner. The peer node '$p_i$' looks up in the plurality of blockchain peer nodes '$BC_D$' and returns the IP address of current owner of the IoT device 'D'. Output of this protocol is that the IoT device 'D' obtains the IP address of its current owner as reported by each peer node '$p_i$' or aborts the process.

TABLE 4

Protocol 4: Obtaining owner information from plurality of peer nodes

| Device (D) | $P_i$ |
|---|---|
| 1. $OWN_{LIST} \leftarrow IP\_ADD$ information already obtained | |
| 2. $MSG = \{$Who is curOWN(D), $CERT(D),\}$ | |
| $\xrightarrow{MSG}$ | |
| | 3. Set $IP\_ADD = IP\ ADD\ [currOWN(D)]$ |
| | 4. compute $\sigma_i = SIGN(IP\_, sk_{p_i})$ |
| | 5. $RESP_i = (IP\_ADD_i, \sigma_i)$ |
| $\xleftarrow{RESP}$ | |
| 6. If $VRFY(\sigma, pk_{pi})$ returns TRUE CONTINUE Else ABORT | |
| $\xrightarrow{OK}$ | |

Each IoT device obtains the response from each peer node comprising (i) the digital signature '$\sigma$' of the corresponding peer node and (ii) an IP address of the current IoT device owner 'currOWND' configured to the peer node. The IoT device further verifies the authentication of the digital signature '$\sigma$' corresponding to the IoT device configured to the peer node and the public key of the peer node. Further, the IP address corresponding to the current owner appends to the current owner list and transmits its signal to proceed with subsequent protocol or else aborts the process. This interactive protocol 4 is provides efficient technique for query response, where the IoT device executes verify($\sigma_i$; $pk_{pi}$) as it needs to verify $CERT(p_i)$ to accept $pk_{pi}$ as a correct public key belonging to $p_i$. Since $CERT(p_i)$ is issued by TIMS and CERT(TIMS) is already embedded inside the device 'D' (at the time of its fabrication) the process of verification of the CERT($p_i$) happens easily. In absence of the TIMS, this process would require 'D' to (permanently) maintain the root certificates of all certificate authorities, thus requiring additional overhead on the tiny resource constrained IoT devices.

Notations used in Protocol 4:
currOWN('D') is the current owner of the device 'D' according to the peer node $p_i$.
$IP_{ADD}$ is the IP Address of current owner of D as obtained by Pi from BCD.
OWN_LIST: This is the list of Owner IP addresses that D has already obtained from some of the peers $p_1 \ldots ; p_m$ where (1_m<n).
$IP_{ADD}$[currOWND(CERT(D))] is the internet address where the device 'D' can connect with its current owner.

Then, selecting the current IoT device owner 'currOWND' for onboarding from the one or more IoT devices using the blockchain network based on the maximum number of occurrence of the current IoT device owner identified in the list. Based on the successful execution of protocol 4 and the list of owners obtained, the protocol 5 chooses the IoT device owner as referred in Table 5.

TABLE 5

Protocol 5: IoT device choosing owner 'D'
Protocol 5 The Device D choose its owner Parties. The device D
Goal. To choose a owner from the list of owners obtained in Protocol 4.
Input: The set $OWN_{LIST} = [IP_{ADD1} \ldots IP_{ADDN}]$ obtained in Protocol 4.
The Protocol:
M1. D chhoses the IP_ADDthat occurs maximum number of times in OWN_LIST as its owner.
M2 If there is no such entry in OWN_LIST then D repeats Protocol 4 and Protocol 5.
M3. Set IOT_CLOUD be the owner chosen by D.
M4. D proceeds to do mutual authentication with IOT_CLOUD.

Here, the IoT device selects the IP address that occurs maximum number of times in the owner list as its owner. If there is no such entry in the owners list then the IoT device repeats the protocol 4 and protocol 5. Further, the IoT device is set to choose the owner and authentication with the IoT cloud is carried.

The embodiments of present disclosure herein address an unresolved problem of onboarding IoT device using the blockchain network. The disclosed system provides a robust model with highly efficient and accurate method for onboarding IoT devices. The method enables IoT device onboarding where at least one IoT device is able to verify blockchain responses with minimal prestored information. When the IoT device is powered on first time and is connected with the blockchain network it proceeds to find its current owner.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for provisioning secure onboarding of at least one Internet of Things (IoT) device using a blockchain network, the method comprising:
   establishing, via one or more hardware processors, a mutual authentication between the at least one IoT device from the one or more IoT devices and a Trusted Identity Management Server (TIMS) comprising:
   (i) authenticating, the at least one IoT device to the TIMS by performing the steps of:
      (a) receiving, by the at least one IoT device, a first set of random numbers generated by the TIMS, wherein the first set of random numbers correspond to the at least one IoT device of the one or more IoT devices;
      (b) computing, by the at least one IoT device, a digital signature corresponding to the at least one IoT device, wherein the computing of the digital signature is based on (i) the first set of random numbers generated by the TIMS, and (ii) a secret key corresponding to the at least one IoT device; and
      (c) receiving, by the TIMS, the digital signature from the at least one IoT device and verifying by the TIMS authentication of the at least one IoT device based on (i) the digital signature computed corresponding to the at least one IoT device, and (ii) a public key of to the at least one IoT device;
   (ii) authenticating the TIMS to the at least one IoT device by:
      (a) receiving, by the at least one IoT device, a second set of random numbers generated by TIMS and comparing the second set of random numbers to an array of prestored random numbers received during previous authentications;
      (b) determining, by the at least one IoT device, whether to abort authentication of the TIMS or to compute an IoT device authentication parameter based on determining whether the second set of random numbers is already in the array of prestored random numbers received during previous authentications and based on determining whether the size of the array of prestored random numbers is lesser than or equal to a predefined parameter, wherein the predefined parameter depends on a capacity of a memory of the at least one IoT device;
      (c) computing, an IoT device authenticating parameter for the at least one IoT device based on hashing (i) a third set of random numbers prestored into read only memory of the at least one IoT device, and (ii) the second set of random numbers generated by the TIMS;
      (d) receiving and verifying, by the IoT device, a digital signature generated by the TIMS based on the IoT device authenticating parameter and a secret key of the TIMS;
   identifying by the at least one IoT device, via the one or more hardware processors, a current owner of the at least one IoT device onboarding in the blockchain network by performing the steps of:
      (i) obtaining, by the at least one IoT device, a response generated from the TIMS for a request initiated by the at least one IoT device based on (i) a list of randomly selected peer nodes, from the blockchain network, comprising a plurality of blockchain identifiers, and (ii) a node parameter generated using the list of randomly selected peer nodes and the secret key of the TIMS;
      (ii) receiving, by the at least one IoT device, the current IoT device owner information by querying a randomly selected peer node of the list of randomly selected peer nodes; and
      (iii) selecting a current IoT device owner for onboarding from the one or more IoT devices using the blockchain network, wherein the selection is based on a maximum occurrence of a current IoT device owner in a list of a plurality of registered IoT device owners.

2. The method as claimed in claim 1, wherein authenticating the TIMS by the at least one IoT device is further based on a public key of the TIMS.

3. The method as claimed in claim 1, wherein querying a randomly selected peer node of the blockchain network to identify the current IoT device owner comprises obtaining, by the at least one IoT device, a response from each peer node comprising the steps of:
   (i) computing, a digital signature of the IoT device for a corresponding peer node, wherein the digital signature is computed using an IP address of the current IoT device owner corresponding to the peer node and a secret key of the peer node; and
   (ii) verifying, by the at least one IoT device, the digital signature corresponding to the IoT device corresponding to the peer node and the public key of the IoT device corresponding to the peer node.

4. A system, for provisioning secure onboarding of at least one Internet of Things (IoT) device using a blockchain network, the method comprising:
   memory storing instructions;
   one or more communication interfaces; and
   one or more hardware processors coupled to the memory via the one or more communication interfaces, wherein the one or more hardware processors are configured by the instructions to:
   establish, a mutual authentication between the at least one IoT device from the one or more IoT devices and a Trusted Identity Management Server (TIMS) comprises:
   (i) authenticating, the at least one IoT device to the TIMS by performing the steps of:
      (a) receiving, by the at least one IoT device, a first set of random numbers generated by the TIMS, wherein the first set of random numbers correspond to the at least one IoT device of the one or more IoT devices;
      (b) computing, by the at least one IoT device, a digital signature corresponding to the at least one IoT device, wherein the computing of the digital signature is based on (i) the first set of random numbers generated by the TIMS, and (ii) a secret key corresponding to the at least one IoT device; and
      (c) receiving, by the TIMS, the digital signature from the at least one IoT device and verifying by the TIMS authentication of the at least one IoT device based on (i) the digital signature computed corresponding to the at least one IoT device, and (ii) a public key of the at least one IoT device;

(ii) authenticating, the TIMS to the at least one IoT device by:

(a) receiving, by the at least one IoT device, a second set of random numbers generated by TIMS and comparing the second set of random numbers to an array of prestored random numbers received during previous authentications;

(b) determining, by the at least one IoT device, whether to abort authentication of the TIMS or to compute an IoT device authentication parameter based on determining whether the second set of random numbers is already in the array of prestored random numbers received during previous authentications and based on determining whether the size of the array of prestored random numbers is lesser than or equal to a predefined parameter, wherein the predefined parameter depends on a capacity of a memory of the at least one IoT device;

(c) computing, an IoT device authenticating parameter for the at least one IoT device based on hashing (i) a third set of random numbers prestored into read only memory of the at least one IoT device, and (ii) the second set of random numbers generated by the TIMS;

(d) receiving and verifying, by the IoT device, a digital signature generated by the TIMS based on the IoT device authenticating parameter and a secret key of the TIMS;

identifying by the at least one IoT device, via the one or more hardware processors, a current owner of the at least one IoT device onboarding in the blockchain network by performing the steps of:

(i) obtaining, by the at least one IoT device, a response generated from the TIMS for a request initiated by the at least one IoT device based on (i) a list of randomly selected peer nodes, from the blockchain network, comprising a plurality of blockchain identifiers, and (ii) a node parameter generated using the list of randomly selected peer nodes and the secret key of the TIMS;

(ii) receiving, by the at least one IoT device, the current IoT device owner information by querying a randomly selected peer node of the list of randomly selected peer nodes; and (iii) selecting a current IoT device owner for onboarding from the one or more IoT devices using the blockchain network, wherein the selection is based on a maximum occurrence of a current IoT device owner in a list of a plurality of registered IoT device owners.

5. The system as claimed in claim 4, wherein authenticating the TIMS by the at least one IoT device is further based on a public key of the TIMS.

6. The system as claimed in claim 4, wherein querying a randomly selected peer node of the blockchain network to identify the current IoT device owner comprises obtaining, by the at least one IoT device, a response from each peer node comprising the steps of:

(i) computing, a digital signature of the IoT device for a corresponding peer node, wherein the digital signature is computed using an IP address of the current IoT device owner corresponding to the peer node and a secret key of the peer node; and (ii) verifying, by the at least one IoT device, the digital signature corresponding to the IoT device corresponding to the peer node and the public key of the IoT device corresponding to the peer node.

7. One or more non-transitory machine-readable information storage mediums comprising one or more instructions which when executed by one or more hardware processors perform actions comprising:

establishing, a mutual authentication between at least one Internet of Things (IoT) device from one or more IoT devices and a Trusted Identity Management Server (TIMS) comprises:

(i) authenticating, the at least one IoT device to the TIMS by performing the steps of:

(a) receiving, by the at least one IoT device, a first set of random numbers generated by the TIMS, wherein the first set of random numbers correspond to the at least one IoT device of the one or more IoT devices;

(b) computing, by the at least one IoT device, a digital signature corresponding to the at least one IoT device, wherein the computing of the digital signature is based on (i) the first set of random numbers generated by the TIMS, and (ii) a secret key corresponding to the at least one IoT device; and (c) receiving, by the TIMS, the digital signature from the at least one IoT device and verifying by the TIM ST authentication of the at least one IoT device based on (i) the digital signature computed corresponding to the at least one IoT device, and (ii) a public key of the at least one IoT device;

(ii) authenticating, the TIMS to the at least one IoT device by:

(a) receiving, by the at least one IoT device, a second set of random numbers generated by TIMS and comparing the second set of random numbers to an array of prestored random numbers received during previous authentications;

(b) determining, by the at least one IoT device, whether to abort authentication of the TIMS or to compute an IoT device authentication parameter based on determining whether the second set of random numbers is already in the array of prestored random numbers received during previous authentications and based on determining whether the size of the array of prestored random numbers is lesser than or equal to a predefined parameter, wherein the predefined parameter depends on a capacity of a memory of the at least one IoT device;

(c) computing, an IoT device authenticating parameter for the at least one IoT device based on hashing (i) a third set of random numbers prestored into read only memory of the at least one IoT device, and (ii) the second set of random numbers generated by the TIMS;

(d) receiving and verifying, by the IoT device, a digital signature generated by the TIMS based on the IoT device authenticating parameter and a secret key of the TIMS;

identifying by the at least one IoT device, via the one or more hardware processors, a current owner of the at least one IoT device onboarding in the blockchain network by performing the steps of:

(i) obtaining, by the at least one IoT device, a response generated from the TIMS for a request initiated by the at least one IoT device based on (i) a list of randomly selected peer nodes, from the blockchain network, comprising a plurality of blockchain identifiers, and (ii) a node parameter generated using the list of randomly selected peer nodes and the secret key of the TIMS;
(ii) receiving, by the at least one IoT device, the current IoT device owner information by querying a randomly selected peer node of the list of randomly selected peer nodes; and
(iii) selecting a current IoT device owner for onboarding from the one or more IoT devices using the blockchain network, wherein the selection is based on a maximum occurrence of a current IoT device owner in a list of a plurality of registered IoT device owners.

8. The one or more non-transitory machine-readable information storage mediums of claim 7, wherein authenticating the TIMS by the at least one IoT device is further based on a public key of the TIMS.

9. The one or more non-transitory machine-readable information storage mediums of claim 7, wherein querying a randomly selected peer node of the blockchain network to identify the current IoT device owner comprises obtaining, by the at least one IoT device, a response from each peer node comprising the steps of:
(i) computing, a digital signature of the IoT device for a corresponding peer node, wherein the digital signature is computed using an IP address of the current IoT device owner corresponding to the peer node and a secret key of the peer node; and
(ii) verifying, by the at least one IoT device, the digital signature corresponding to the IoT device corresponding to the peer node and the public key of the IoT device corresponding to the peer node.

* * * * *